United States Patent
Eriksson et al.

(10) Patent No.: US 11,262,459 B2
(45) Date of Patent: Mar. 1, 2022

(54) ENHANCED OBJECT POSITION DETECTION

(71) Applicants: VEONEER SWEDEN AB, Vargarda (SE); Olof Eriksson, Älvsjö (SE); Tobias Aderum, Gothenburg (SE); Driouichi Chafik, Lund (SE); Meifang Zhu, Lund (SE)

(72) Inventors: Olof Eriksson, Älvsjö (SE); Tobias Aderum, Gothenburg (SE); Driouichi Chafik, Lund (SE); Meifang Zhu, Lund (SE)

(73) Assignee: VEONEER SWEDEN AB, Vargarda (SE)

( * ) Notice: Subject to any disclaimer, the term of this patent is extended or adjusted under 35 U.S.C. 154(b) by 364 days.

(21) Appl. No.: 16/493,434

(22) PCT Filed: Mar. 14, 2018

(86) PCT No.: PCT/EP2018/056449
§ 371 (c)(1),
(2) Date: Sep. 12, 2019

(87) PCT Pub. No.: WO2018/167175
PCT Pub. Date: Sep. 20, 2018

(65) Prior Publication Data
US 2020/0011960 A1  Jan. 9, 2020

(30) Foreign Application Priority Data
Mar. 17, 2017 (EP) .................................... 17161659

(51) Int. Cl.
*G01S 19/51* (2010.01)
*H04W 4/46* (2018.01)
(Continued)

(52) U.S. Cl.
CPC .............. *G01S 19/51* (2013.01); *B60R 21/01* (2013.01); *B60R 21/0134* (2013.01);
(Continued)

(58) Field of Classification Search
CPC ...... G01S 7/4026; G01S 7/403; G01S 17/931; G01S 13/867; G01S 13/44;
(Continued)

(56) References Cited

U.S. PATENT DOCUMENTS 9,594,159 B2 * 3/2017 Wang ....................... G01S 7/414
2005/0065740 A1 * 3/2005 Raykar .................... H04R 5/02
702/57

(Continued)

OTHER PUBLICATIONS

International Search Report and Written Opinion of PCT/EP2018/056449, dated May 22, 2018.
(Continued)

*Primary Examiner* — Olumide Ajibade Akonai
(74) *Attorney, Agent, or Firm* — Dickinson Wright PLLC

(57) ABSTRACT

A position estimation unit (2) comprising a first transceiver device (3) and a processing unit (10) that is arranged to repeatedly calculate time-of-flight (TOF) for radio signals ($x_1, x_2, x_3, x_4, x_5, x_6$) sent pair-wise between two transceivers among the first transceiver device (3) and at least two other transceiver devices (7, 8, 9); calculate possible positions for the transceiver devices (3, 7, 8, 9), which results in possible positions for each transceiver device (3, 7, 8, 9); and perform Multidimensional scaling (MDS) calculation in order to obtain relative positions of the transceiver devices (3, 7, 8, 9) in a present coordinate system. After two initial MDS calculations, between every two consecutive MDS calculations, the processing unit (10) is arranged to repeatedly perform a processing procedure comprising translation, scaling and rotation of present coordinate system such that a corrected present coordinate system is acquired. The
(Continued)

processing procedure is arranged to determine the corrected present coordinate system such that a smallest change for the relative positions of the transceiver devices (3, 7, 8, 9) between the consecutive MDS calculations is obtained.

10 Claims, 2 Drawing Sheets

(51) Int. Cl.
| | |
|---|---|
| *B60W 30/095* | (2012.01) |
| *G01S 19/48* | (2010.01) |
| *G08G 1/16* | (2006.01) |
| *G01S 5/00* | (2006.01) |
| *G01S 5/02* | (2010.01) |
| *H04L 43/0864* | (2022.01) |
| *H04W 56/00* | (2009.01) |
| *G01S 19/39* | (2010.01) |
| *B60R 21/01* | (2006.01) |
| *B60R 21/0134* | (2006.01) |
| *B60R 21/231* | (2011.01) |
| *B60R 21/36* | (2011.01) |
| *B60R 22/48* | (2006.01) |
| *G08G 1/01* | (2006.01) |
| *G05D 1/00* | (2006.01) |
| *G05D 1/02* | (2020.01) |
| *G08G 1/00* | (2006.01) |
| *G01S 13/87* | (2006.01) |

(52) U.S. Cl.
CPC ........ *B60R 21/23138* (2013.01); *B60R 21/36* (2013.01); *B60R 22/48* (2013.01); *B60W 30/0953* (2013.01); *G01S 5/0072* (2013.01); *G01S 5/0289* (2013.01); *G01S 13/878* (2013.01); *G01S 19/396* (2019.08); *G01S 19/48* (2013.01); *G05D 1/0022* (2013.01); *G05D 1/0027* (2013.01); *G05D 1/0214* (2013.01); *G05D 1/0217* (2013.01); *G05D 1/0295* (2013.01); *G08G 1/0112* (2013.01); *G08G 1/0133* (2013.01); *G08G 1/161* (2013.01); *G08G 1/164* (2013.01); *G08G 1/166* (2013.01); *G08G 1/22* (2013.01); *H04L 43/0864* (2013.01); *H04W 4/46* (2018.02); *H04W 56/006* (2013.01); *H04W 56/0065* (2013.01); *B60R 2021/01088* (2013.01); *B60R 2021/01231* (2013.01); *B60R 2021/01272* (2013.01); *B60W 2554/80* (2020.02); *B60W 2556/65* (2020.02); *G01S 2205/002* (2013.01)

(58) Field of Classification Search
CPC ..... G01S 2013/9323; G01S 2013/9324; G01S 13/931; G01S 2013/93271; G01S 2013/93272; G01S 2013/93274; G01S 7/40; G01S 13/878; G01S 19/396; G01S 19/51; G01S 5/0289; G01S 13/765; G01S 5/0036; G01S 5/0244; G01S 5/0257; G01S 5/02; G01S 5/021; G01S 5/0242; G01S 5/14; G01S 5/30; B60W 40/02; B60W 40/105; B60W 40/114; B60W 2420/42; B60W 2420/506; B60W 2420/54; B60W 2520/10; B60W 2520/14; H04W 4/46; H04W 56/006; H04W 84/18; H04W 64/00; H04W 24/10; H04W 4/30; H04W 4/33; B60R 21/01; B60R 21/0134; B60R 21/23138; B60R 21/36; B60R 22/48; G05D 1/0022; G05D 1/0027; G05D 1/0214; G05D 1/0217; G05D 1/0295; G08G 1/0112; G08G 1/0133; G08G 1/161; G08G 1/164; G08G 1/166; G08G 1/22; G01C 21/165; G01C 21/30
See application file for complete search history.

(56) References Cited

U.S. PATENT DOCUMENTS

| | | | | |
|---|---|---|---|---|
| 2014/0179340 | A1* | 6/2014 | Do | G01S 13/765 |
| | | | | 455/456.1 |
| 2014/0185520 | A1* | 7/2014 | Gao | H04W 24/10 |
| | | | | 370/328 |
| 2017/0199912 | A1* | 7/2017 | Su | G06F 16/26 |
| 2017/0359697 | A1* | 12/2017 | Bhatti | G01S 5/14 |
| 2018/0054706 | A1* | 2/2018 | Kastee | G01S 5/0072 |
| 2018/0114441 | A1* | 4/2018 | Marmet | G01S 19/48 |

OTHER PUBLICATIONS

Bastani, Hamed, et al., "Precise Realtime Localization by RF Transceiver ToF Measurements", Advanced Robotics, 2009. ICAR 2009. International Conference On, IEEE, Piscataway, NJ, USA, Jun. 22, 2009 (Jun. 22, 2009), pp. 1-6, XP031497273, ISBN: 978-1-4244-4855-5, pp. 1-3.

Beck, Brian, et al., "Anchor Free Node Tracking Using Ranges, Odometry, and Multidimensional Scaling", 2014 IEEE International Conference On Acoustics, Speech and Signal Processing (ICASSP), IEEE, May 4, 2014 (May 4, 2014), pp. 2209-2213, XP032616656, DOI: 10.1109/ICASSP.2014.6853991, p. 2209-2213.

Theobald, D. L., et al., "Empirical Bayes hierarchical models for regularizing maximum likelihood estimation in the matrix Gaussian Procrustes problem", Proceedings National Academy of Sciences PNAS, vol. 103, No. 49, Dec. 5, 2006 (Dec. 5, 2006), pp. 18521-18527, XP055411937, US, ISSN: 0027-8424, DOI: 10.1073/pnas.0508445103.

* cited by examiner ial Application No. PCT/EP2018/056449, filed Mar. 14, 2018, which claims the benefit of priority under 35 U.S.C. § 119 to European Patent Application No., 17161659.2 filed Mar. 17, 2017, the contents of which are incorporated herein by reference in their entirety.

FIELD OF THE INVENTION

The present disclosure relates to a position estimation unit comprising a first transceiver device, arranged for sending and receiving radio signals, and a processing unit.

BACKGROUND

Today, there are many vehicle environment detection systems, such as for example camera systems, Doppler radar systems and LIDAR systems, that can be mounted on a vehicle in order to detect objects in order to implement functions such as speed control and collision prevention, as well as other such as auto alignment, online bumper fascia calibration, ego motion estimation and scene understanding.

It is, however, desired to obtain a high degree of accuracy regarding an ego vehicle's position relative other vehicles and objects for certain application such as collision prediction algorithms like Intersection Movement Assist (IMA), Left Turn Assist (LTA), Forward Collision Warning (FCW) or Lane Change Warning (LCW). Inaccuracies can lead to both false-positives and false-negatives. GPS (Global position system) and GNSS (Global Navigation Satellite Systems) are not providing sufficient degree of accuracy, especially in urban conditions.

It is previously known to use periodic broadcasts to perform inter-vehicle range estimation, where a propagation delay of a wireless signal from a transmitter to a receiver is used for estimating a distance. Round-trip-time (RTT) is used for estimating such a distance more accurately by sending a wireless signal between three or more vehicles or objects, one at a time. This is described in the paper "Inter-vehicle range estimation from periodic broadcasts" by Urs Niesen, Venkatesan N. Ekambaram, Jubin Jose, and Xinzhou Wu.

In order to establish initial positions from the measured ranges, MDS (Multidimensional scaling) is used, for example as described in the paper "Joint relative position and velocity estimation for an anchorless network of mobile nodes" by Raj Thilak Rajan, Geert Leus, and Alle-Jan van der Veen.

However, using RTT for estimating relative positions results in a multitude of solutions, since there are more unknowns than the number of equations.

It is therefore desired to obtain more reliable and unambiguous methods and devices for obtaining relative distances between objects by means of RTT measurements.

This is achieved by means of a position estimation unit comprising a first transceiver device, arranged for sending and receiving radio signals, and a processing unit. The processing unit is arranged to repeatedly:
Calculate time-of-flight (TOF) for radio signals sent pair-wise between two transceivers among the first transceiver device and at least two other transceiver devices.
Calculate possible positions for the transceiver devices, which results in a plurality of possible positions for each transceiver device.
Perform Multidimensional scaling (MDS) calculation in order to obtain relative positions of the transceiver devices in a present coordinate system.

After two initial MDS calculations, between every two consecutive MDS calculations, the processing unit (10) is arranged to repeatedly perform a processing procedure includes translation, scaling and rotation of present coordinate system such that a corrected present coordinate system is acquired. The processing procedure is arranged to determine the corrected present coordinate system such that a smallest change for the relative positions of the transceiver devices between the consecutive MDS calculations is obtained.

This is also achieved by a position estimation method including repeatedly:
Calculating time-of-flight (TOF) for radio signals sent pair-wise between two transceivers among a first transceiver device and at least two other transceiver devices.
Calculating possible positions for the transceiver devices, which results in a plurality of possible positions for each transceiver device.
Performing Multidimensional scaling (MDS) calculation for obtaining relative positions of the transceiver devices in a present coordinate system.

After two initial MDS calculations, between every two consecutive MDS calculations, the method includes performing a processing procedure including translation, scaling and rotation of present coordinate system such that a corrected present coordinate system is acquired. The processing procedure is used for determining the corrected present coordinate system such that a smallest change for the relative positions of the transceiver devices between the consecutive MDS calculations is obtained.

According to some aspects of embodiments of the present invention, for each pair of transceivers, the processing unit is arranged to calculate time-of-flight either as the time from that a radio signal travels from a transmitting transceiver to a receiving transceiver, or as the time from that a radio signal travels from a transmitting transceiver to a receiving transceiver and back to the transmitting transceiver, at least one time, such that round-trip time (RTT) is acquired for each pair of transceivers.

According to some aspects of embodiments of the present invention, the processing unit is arranged to calculate time-of-flight either with knowledge of a delay time between each transmission, or by repeated transmissions with time stamps at the different transceivers.

Other examples of embodiments of the present invention are further disclosed herein.

A number of advantages are obtained by the present disclosure. Mainly, relative positions for objects are obtained with high accuracy and in a more reliable and unambiguous manner than presented by prior art.

BRIEF DESCRIPTION OF THE DRAWINGS

The present disclosure will now be described more in detail with reference to the appended drawings, where.

DETAILED DESCRIPTION

Figure 1:
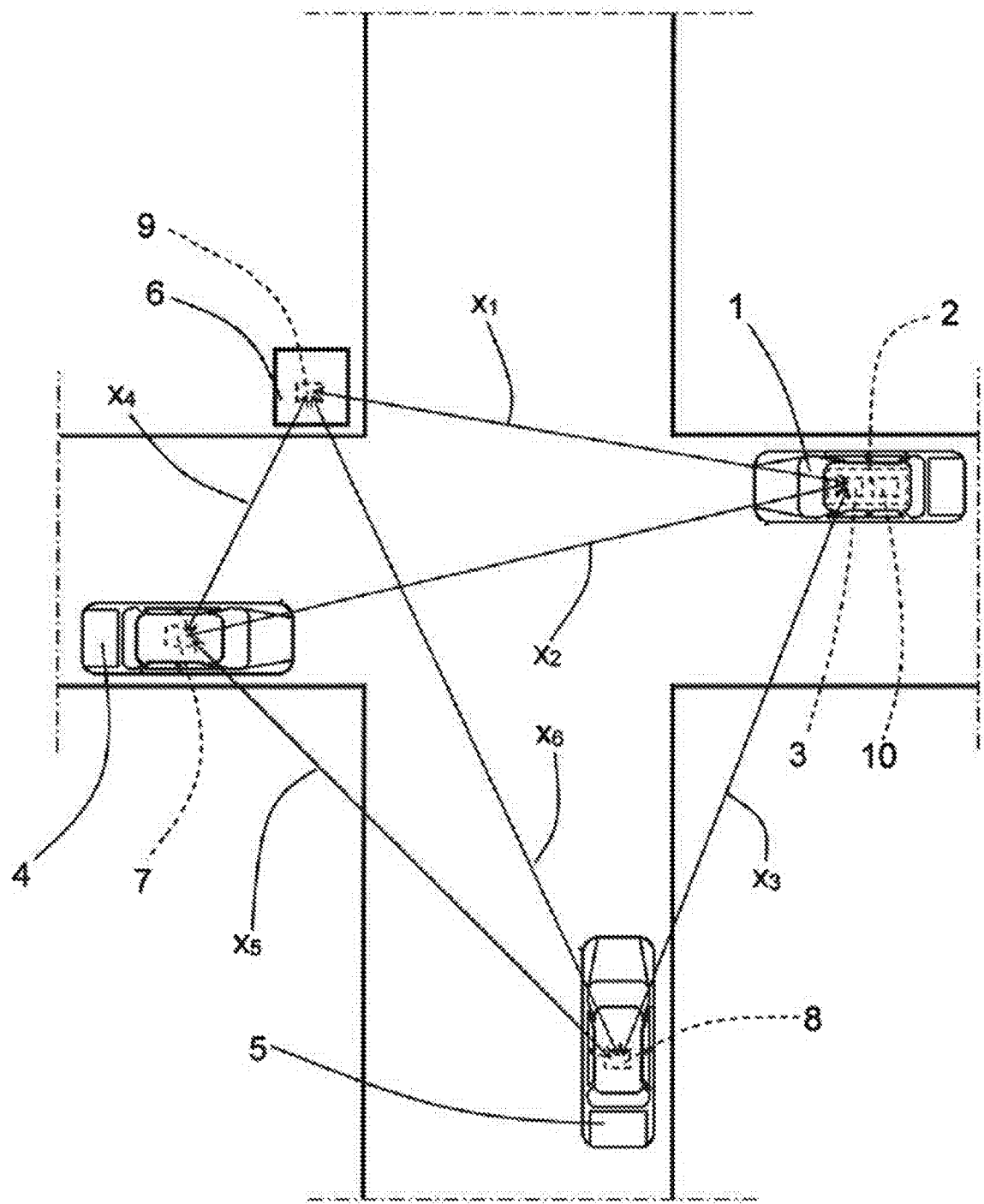
FIG. 1 shows a schematic top view of a vehicle with a position estimation unit in a traffic situation.

With reference to FIG. 1, showing a first example, an ego vehicle 1 includes a position estimation unit 2 that in turn includes a first transceiver device 3 arranged for sending and receiving radio signals, according to some aspects it is a short-range transceiver device such as a Wi-Fi (Wireless Fidelity) transceiver device arranged for DSRC (dedicated short-range communication). Such communications can for example be V2V (vehicle to vehicle) and V2X (vehicle to infrastructure) communication. There is a first target vehicle 4, a second target vehicle 5 and a fixed object 6 which also includes a corresponding second transceiver device 7, third transceiver device 8 and fourth transceiver device 9.

The position estimation unit 2 further includes a processing unit 10 that is arranged to calculate round-trip time (RTT) for radio signals $x_1$, $x_2$, $x_3$ sent between the first transceiver device 3 and the other transceiver devices 7, 8, 9, radio signals $x_2$, $x_4$, $x_5$ sent between the second transceiver device 7 and the other transceiver devices 3, 8, 9, radio signals $x_3$, $x_5$, $x_6$ sent between the third transceiver device 8 and the other transceiver devices 3, 7, 9 as well as radio signals $x_1$, $x_4$, $x_6$ sent between the fourth transceiver device 9 and the other transceiver devices 3, 7, 8. Starting from these RTTs. The processing unit 10 is arranged to calculate possible positions for the transceiver devices 3, 7, 8, 9, which results in a plurality of possible positions for each transceiver device 3, 7, 8, 9 since there are more unknowns than the number of equations.

Calculating RTT is only one example, the processing unit 10 is generally arranged to calculate time-of-flight (TOF) pair-wise between two transceivers among three or more transceivers, for each pair of transceivers either as:

The time from that a radio signal $x_1$, $x_2$, $x_3$, $x_4$, $x_5$, $x_6$ travels from a transmitting transceiver 3 to a receiving transceiver 7, or as The time from that a radio signal $x_1$, $x_2$, $x_3$, $x_4$, $x_5$, $x_6$ travels from a transmitting transceiver 3 to a receiving transceiver 7 and back to the transmitting transceiver 3, possibly including a delay time, one or more times.

In the first case, it is necessary that the transceivers in question have accurately synchronized clocks, and in the second case, which is what is referred to as RTT in this context, it is not necessary that the transceivers in question have synchronized clocks, but that the delay time is known. If the delay time is not known, repeated transmissions are needed, with time stamps at the different transceivers.

Having calculated the possible positions for the transceiver devices 3, 7, 8, 9, the processing unit 10 is arranged to perform a first MDS (Multidimensional scaling) in order to obtain first relative positions of the first transceiver device 3, the second transceiver device 7, the third transceiver device 8 and the fourth transceiver device 9 in a first coordinate system.

The processing unit 10 is then arranged to perform a second MDS, at a later time, in order to obtain second relative positions of first transceiver device 3, the second transceiver device 7, the third transceiver device 8 and the fourth transceiver device 9 in a second coordinate system. The second MDS results in other relative positions of the transceiver devices 3, 7, 8, 9 since another coordinate system has been used.

According to the present disclosure, the processing unit 10 is then arranged to perform a processing procedure including translation, scaling and rotation of the second coordinate system such that a corrected coordinate system is acquired, where the processing procedure is arranged to determine the corrected coordinate system such that a smallest change for the relative positions of the transceiver devices 3, 7, 8, 9 from the first MDS to the second MDS is achieved.

For each following MDS, a processing procedure includes translation, scaling and rotation of the present coordinate system is performed such that a corrected present coordinate system is obtained.

This means that the processing unit 10 is arranged to repeatedly:

Calculate TOF, possibly as RTT, for radio signals at least sent between the first transceiver device 3 and the other transceiver devices 7, 8, 9.

Calculate possible positions for the transceiver devices 3, 7, 8, 9, which results in a plurality of possible positions for each transceiver device 3, 7, 8, 9.

Perform MDS calculations in order to obtain relative positions of the transceiver devices 3, 7, 8, 9 in a present coordinate system.

After two initial MDS calculations, between every two consecutive MDS calculations, the processing unit 10 is arranged to repeatedly perform a processing procedure including translation, scaling and rotation of present coordinate system such that a corrected present coordinate system is acquired. The processing procedure is arranged to determine the corrected present coordinate system such that a smallest change for the relative positions of the transceiver devices 3, 7, 8, 9 between the consecutive MDS calculations is obtained.

According to some aspects, the processing procedure is performed by use of an MLE (Maximum Likelihood Estimation) algorithm or an LSE (Least Squares Estimation).

According to some aspects, in order to enhance the accuracy, vehicle dynamics including gyro data, acceleration data and velocity data are used by the processing unit 10.

Figure 2:
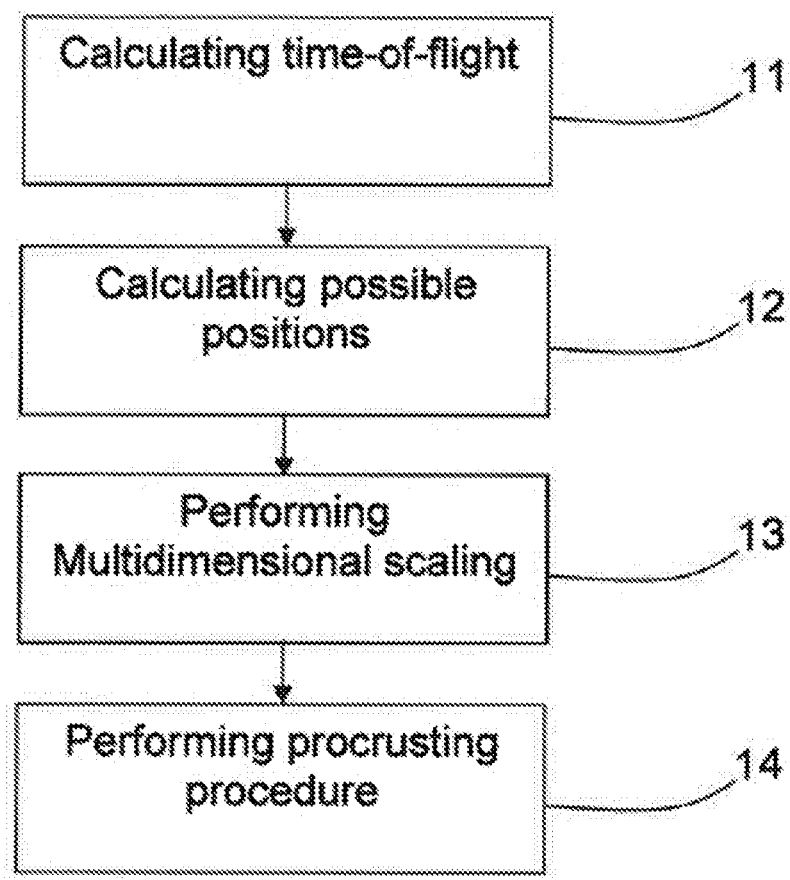
FIG. 2 shows a flowchart for a method according to the present disclosure.

With reference to FIG. 2, the present disclosure also relates to a position estimation method including repeatedly:

Step 11: Calculating time-of-flight (TOF) for radio signals $x_1$, $x_2$, $x_3$, $x_4$, $x_5$, $x_6$ sent pair-wise between two transceivers among a first transceiver device 3 and at least two other transceiver devices 7, 8, 9.

Step 12: Calculating possible positions for the transceiver devices 3, 7, 8, 9, which results in a plurality of possible positions for each transceiver device 3, 7, 8, 9.

Step 13: Performing Multidimensional scaling, (MDS) calculation for obtaining relative positions of the transceiver devices 3, 7, 8, 9 in a present coordinate system.

After two initial MDS calculations, between every two consecutive MDS calculations, the method includes:

Step 14: Performing a processing procedure including translation, scaling and rotation of present coordinate system such that a corrected present coordinate system is acquired, where the processing procedure is used for determining the corrected present coordinate system such that a smallest change for the relative positions of the transceiver devices 3, 7, 8, 9 between the consecutive MDS calculations is obtained.

The present disclosure is not limited to the examples above, but may vary freely within the scope of the appended claims. For example, the transceiver devices 3, 7, 8, 9 are assumed to be of a previously known design. The processing unit 10 is for example connected to a warning and/or information device included in the vehicle 1 in a previously known manner.

The calculations and determining procedures are performed by the processing unit 10, where the processing unit 10 should be regarded as a processing unit arrangement that is in the form of one unit or several units that either co-operate or handle different tasks more or less independently. In the case of several units, these may be placed adjacent to each other, or in a distributed manner.

According to some aspects, the transceiver device 3 in the ego vehicle does not exclude other vehicle environment detection devices such as radar devices, camera devices, LIDAR devices and other similar arrangements.

According to some aspects, the transceiver devices 7, 8 in the other vehicles 4, 5 may also include corresponding position estimation units in these vehicles 4, 5.

The fixed object 6 can be any type of infrastructure object such as for example a traffic sign, traffic light or part of a building.

The transceiver devices 3, 7, 8, 9 can be fixed and/or mobile in any suitable combination. Each TOF calculation is performed pair-wise for the transceiver devices 3, 7, 8, 9, and at least three transceiver devices 3, 7, 8, 9 are required for the calculations described.

According to some aspects, in order to acquire a suitable estimate of the relative positions of the transceiver devices 3, 7, 8, 9, the processing unit 10 is arranged to repeatedly perform at least five processing procedures with intermediate MDS calculations.

In this context, the term repeatedly generally means that a procedure or calculation is repeated a plurality of times, without specifying how many times.

All details given in the examples are of course only given as an illustration of the present disclosure, and should not be regarded as limiting in any way.

Generally, the present disclosure relates to a position estimation unit 2 including a first transceiver device 3, arranged for sending and receiving radio signals, and a processing unit 10, where the processing unit 10 is arranged to repeatedly:

Calculate time-of-flight (TOF) for radio signals $x_1$, $x_2$, $x_3$, $x_4$, $x_5$, $x_6$ sent pair-wise between two transceivers among the first transceiver device 3 and at least two other transceiver devices 7, 8, 9;

Calculate possible positions for the transceiver devices 3, 7, 8, 9, which results in a plurality of possible positions for each transceiver device 3, 7, 8, 9; and Perform Multidimensional scaling (MDS) calculation in order to obtain relative positions of the transceiver devices 3, 7, 8, 9 in a present coordinate system.

After two initial MDS calculations, between every two consecutive MDS calculations, the processing unit 10 is arranged to repeatedly:

Perform a processing procedure including translation, scaling and rotation of present coordinate system such that a corrected present coordinate system is acquired, where the processing procedure is arranged to determine the corrected present coordinate system such that a smallest change for the relative positions of the transceiver devices 3, 7, 8, 9 between the consecutive MDS calculations is obtained.

According to some aspects, for each pair of transceivers, the processing unit 10 is arranged to calculate time-of-flight either as the time from that a radio signal $x_1$, $x_2$, $x_3$, $x_4$, $x_5$, $x_6$ travels from a transmitting transceiver to a receiving transceiver, or as the time from that a radio signal $x_1$, $x_2$, $x_3$, $x_4$, $x_5$, $x_6$ travels from a transmitting transceiver to a receiving transceiver and back to the transmitting transceiver, at least one time, such that round-trip time (RTT) is acquired for each pair of transceivers.

According to some aspects, the processing unit 10 is arranged to calculate time-of-flight either with knowledge of a delay time between each transmission, or by repeated transmissions with time stamps at the different transceivers.

According to some aspects, the processing unit 10 is arranged to perform the processing procedure by use of an MLE (Maximum Likelihood Estimation) algorithm.

According to some aspects, the position estimation unit 2 is positioned in an ego vehicle 1, where the processing unit 10 is arranged acquire vehicle dynamics for the ego vehicle 1, at least including one of gyro data, acceleration data and velocity data, and to apply these data in the calculation of relative positions of the transceiver devices 3, 7, 8, 9.

Generally, the present disclosure also relates to a position estimation method including repeatedly:

Calculating time-of-flight (TOF) for radio signals $x_1$, $x_2$, $x_3$, $x_4$, $x_5$, $x_6$ sent pair-wise between two transceivers among a first transceiver device 3 and at least two other transceiver devices 7, 8, 9;

Calculating possible positions for the transceiver devices 3, 7, 8, 9, which results in a plurality of possible positions for each transceiver device 3, 7, 8, 9; and Performing Multidimensional scaling (MDS) calculation for obtaining relative positions of the transceiver devices 3, 7, 8, 9 in a present coordinate system.

After two initial MDS calculations, between every two consecutive MDS calculations, the method includes:

Performing a processing procedure including translation, scaling and rotation of present coordinate system such that a corrected present coordinate system is acquired, where the processing procedure is used for determining the corrected present coordinate system such that a smallest change for the relative positions of the transceiver devices 3, 7, 8, 9 between the consecutive MDS calculations is obtained.

According to some aspects, for each pair of transceivers, the method includes calculating time-of-flight either as the time from that a radio signal $x_1$, $x_2$, $x_3$, $x_4$, $x_5$, $x_6$ travels from a transmitting transceiver to a receiving transceiver, or as the time from that a radio signal $x_1$, $x_2$, $x_3$, $x_4$, $x_5$, $x_6$ travels from a transmitting transceiver to a receiving transceiver and back to the transmitting transceiver, at least one time, such that round-trip time (RTT) is acquired for each pair of transceivers.

According to some aspects, the method includes calculating time-of-flight either with knowledge of a delay time between each transmission, or by repeated transmissions with time stamps at the different transceivers.

According to some aspects, the method includes performing the processing procedure by use of an MLE (Maximum Likelihood Estimation) algorithm.

According to some aspects, the method includes acquiring vehicle dynamics for an ego vehicle 1, the vehicle dynamics at least including one of gyro data, acceleration data and velocity data, and applying these data in the calculation of relative positions of the transceiver devices 3, 7, 8, 9.

While the above description constitutes the preferred embodiment of the present invention, it will be appreciated that the invention is susceptible to modification, variation and change without departing from the proper scope and fair meaning of the accompanying claims.

The invention claimed is:

1. A position estimation unit comprising, a first transceiver device, arranged for sending and receiving radio signals, and a processing unit, where the processing unit is arranged to repeatedly:

calculate a time-of-flight for the radio signals sent between a pair of two transceivers including a first transceiver device and at least two second transceiver devices;

calculate possible positions for the first and second transceiver devices, which results in a plurality of possible positions for each of the first and second transceiver devices; and perform a multidimensional scaling calculation in order to obtain relative positions of the first and second transceiver devices in a present coordinate system;

after two initial multidimensional scaling calculations, between every two consecutive multidimensional scaling calculations, the processing unit is arranged to repeatedly:

perform a processing procedure including a translation, a scaling and a rotation of the present coordinate system such that a corrected present coordinate system is acquired, where the processing procedure is arranged to determine the corrected present coordinate system such that a smallest change for the relative positions of the first and second transceiver devices between the consecutive multidimensional scaling calculations is obtained.

2. A position estimation unit according to claim 1 further comprising, that for each pair of the first and second transceivers, the processing unit is arranged to calculate the time-of-flight either as the time from that the radio signal travels from a transmitting transceiver to a receiving transceiver of the first and second transceivers, or as the time from that the radio signal travels from the transmitting transceiver to the receiving transceiver and back to the transmitting transceiver, at least one time, such that a round-trip time is acquired for the pair of transceivers.

3. A position estimation unit according to claim 2 further comprising, the processing unit is arranged to calculate the time-of-flight either using a delay time between consecutive transmitting, or by repeated transmissions with time stamps at the transceivers.

4. A position estimation unit according to claim 1 further comprising, that the processing unit is arranged to perform the processing procedure by a Maximum Likelihood Estimation algorithm.

5. A position estimation unit according to claim 1 further comprising, that the position estimation unit is positioned in an ego vehicle, where the processing unit is arranged to acquire vehicle dynamics for the ego vehicle, at least comprising one of a gyro data, an acceleration data and a velocity data, and to apply the data in the calculation of relative positions of the first and second transceiver devices.

6. A position estimation method comprising the steps of repeatedly:

calculating a time-of-flight, for radio signals sent pairwise between two transceivers including a first transceiver device and at least two second transceiver devices;

calculating possible positions for the first and second transceiver devices, which results in a plurality of possible positions for each of the transceiver device; and performing a multidimensional scaling calculation for obtaining relative positions of the first and second transceiver devices in a present coordinate system;

after two initial multidimensional scaling calculations, between every two consecutive multidimensional scaling calculations, the method further comprises:

performing a processing procedure comprising a translation, a scaling and a rotation of the present coordinate system such that a corrected present coordinate system is acquired, where the processing procedure is used for determining the corrected present coordinate system such that a smallest change for the relative positions of the transceiver devices between the consecutive multidimensional scaling calculations is obtained.

7. The position estimation method according to claim 6 wherein in that for each of the pair of the first and second transceivers, the method further comprises calculating a time-of-flight either as the time from that the radio signal travels from a transmitting transceiver to a receiving transceiver of the first and second transceivers, or as the time from that the radio signal travels from the transmitting transceiver to the receiving transceiver and back to the transmitting transceiver, at least one time, such that a round-trip time is acquired for each of the pair of the transceivers.

8. The position estimation method according to claim 7 wherein the method further comprises, calculating the time-of-flight either using a delay time between each transmission, or by repeated transmissions with time stamps at the transceivers.

9. The position estimation method according to claim 6 wherein the method further comprises, performing the processing procedure by use of a Maximum Likelihood Estimation algorithm.

10. The position estimation method according to claim 6 wherein the method further comprises, acquiring vehicle dynamics for an ego vehicle, the vehicle dynamics at least comprising one of a gyro data, a acceleration data and a velocity data, and applying the data in the calculation of relative positions of the transceiver devices.

* * * * *